United States Patent [19]

Kazino

[11] Patent Number: 5,444,908
[45] Date of Patent: Aug. 29, 1995

[54] DIE FOR DRIVING PIERCE NUT

[75] Inventor: Hiroshi Kazino, Komaki, Japan

[73] Assignee: Aoyama Seisakusho Co., Ltd., Nagoya, Japan

[21] Appl. No.: 243,552

[22] Filed: May 16, 1994

Related U.S. Application Data

[63] Continuation of Ser. No. 21,357, Feb. 23, 1993, abandoned.

[51] Int. Cl.⁶ .................. B23P 19/00; B21D 28/34
[52] U.S. Cl. .................. 29/798; 29/243.517; 29/432.2; 83/146; 83/690
[58] Field of Search ............ 29/432, 432.1, 432.2, 29/798, 243.5, 243.517; 72/329, 330, 337; 83/146, 147, 690

[56] References Cited

U.S. PATENT DOCUMENTS

| | | |
|---|---|---|
| 3,253,631 | 5/1966 | Reusser . |
| 3,766,628 | 10/1973 | Grube .................. 29/798 |
| 3,921,276 | 11/1975 | Oaks .................. 29/798 |
| 4,064,617 | 12/1977 | Oaks .................. 29/432.1 |
| 4,516,450 | 5/1985 | Shuttleworth .......... 83/146 |
| 4,711,021 | 12/1987 | Muller .................. 29/798 |
| 5,146,672 | 9/1992 | Muller .................. 29/798 |
| 5,174,018 | 12/1992 | Muller .................. 29/798 |
| 5,340,251 | 8/1994 | Takahashi et al. ...... 29/432.2 X |

FOREIGN PATENT DOCUMENTS

2188268  9/1987  United Kingdom .

*Primary Examiner*—Tom Hughes
*Attorney, Agent, or Firm*—Frishauf, Holtz, Goodman & Woodward

[57] ABSTRACT

A die assembly for driving a pierce nut which comprises an annular coining portion provided on the top of a die body, the inner surface of the annular coining portion being continuous with a center aperture of the die body. An annular projection is provided at the upper portion of the center aperture for surely and temporarily holding punched debris in of the die body, near the annular coining portion, the center aperture. It is therefore possible to provide an inexpensive nut-driving die assembly with improved durability, and which can prevent debris, punched by shearing between a pierce nut and a metal panel and remaining at the upper portion of the center aperture, from being lifted up when the metal panel is lifted from the die body, thereby ensuring a continuous driving work.

8 Claims, 4 Drawing Sheets

DIE FOR DRIVING PIERCE NUT

This application is a Continuation of application Ser. No. 08/021,357, filed Feb. 23, 1993, now abandoned.

BACKGROUND OF THE INVENTION

The present invention relates to a die for driving a pierce nut into a metal panel for clinch interconnection.

The use of a pierce nut is one way of forming an internal thread in a pressed sheet metal. At the time of pressing metal, a pierce nut is pressed against a metal panel so that its punching portion pierces the metal panel, forming a bolt aperture, and at the same time, the nut itself is attached to the metal panel by clinching. For clinch interconnection of the pierce nut to the metal panel, as shown in FIG. 4, a die for driving a pierce nut is set first. An annular coining portion 2 having its inner surface continuous to a center aperture 3 is provided on the top of a die body 1 of the die. A metal panel 10 is then placed on the annular coining portion 2 on the top of this die, and, a pierce nut 20 is driven into the straight center aperture 3 from above the metal panel 10 by a punch 30 to pierce the metal panel 10 by shearing between the outer surface of the pierce nut 20 (punch portion 22 of the nut) and the annular coining portion 2 on the top of the die. At the same time, the pierce nut 20 is attached to the metal panel 10 by clinching.

The center aperture 3 of the conventional pierce-nut driving die of this type has a straight surface so that debris 11 is merely held by frictional force. When the metal panel is lifted from the die body by a lifting load, the debris is lifted together with the metal panel and is put on the top of the die body, which is likely to stand in the way of a continuous driving work or damage the die. These sort of troubles are often observed in a clinching operation using thin metal panels of 1 mm thickness or thinner.

In an ordinary punch-die set, there is small clearance between the punch and the die aperture, and it is possible to provide a large amount of overlapping of the punch into the die aperture during a piercing operation of the metal panel. The debris is therefore pushed down to the relief portion of the die aperture (the aperture portion with an increased diameter where the debris can fall freely) so that the debris easily falls down. In the case of a pierce nut, however, such a situation is not expected due to structural as well as manufacturing restrictions.

SUMMARY OF THE INVENTION

It is an object of the present invention to provide an inexpensive die for driving a pierce nut, which does not have the aforementioned shortcomings, and which temporarily surely holds punched debris in a center aperture so that the debris is not lifted together with a metal panel when lifting the metal panel from a die body to thereby remove an obstruction to a continuous driving work and prevent the die body from being damaged by the lifting of the debris, thus improving the durability of the die.

To achieve the object, a die for driving a pierce nut according to the present invention comprises a die body having a center aperture; an annular coining portion protrusively provided on the top of the die body and having an inner surface continuous to the center aperture; and at least one annular projection at an upper portion of the center aperture for temporarily holding punched debris pressed into the center aperture.

DETAILED DESCRIPTION OF THE PREFERRED EMBODIMENT

A preferred embodiment of the present invention will now be described referring to the accompanying drawings.

Figure 1:
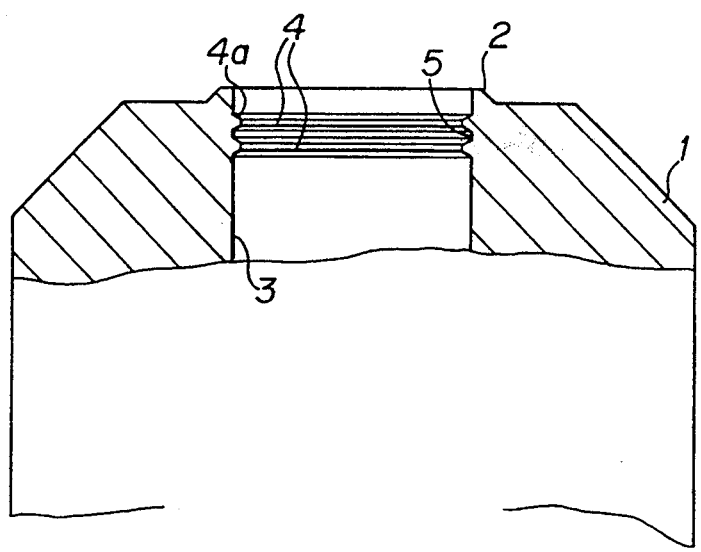
FIG. 1 is a partly cutaway front view of one embodiment of the present invention.

Referring to FIG. 1, an annular coining portion 2 for piercing a metal panel, which has its inner surface continuous to a center aperture 3, is protrusively provided on the top of a cylindrical die body 1. This structure is not particularly different from that of the conventional die assembly for driving a pierce nut of this type. It is preferable that the annular coining portion 2 has the outer surface thereof tapered in order to sufficiently endure repetitive driving. It is particularly preferable that the taper angle be between 20° to 30°.

Figure 2:
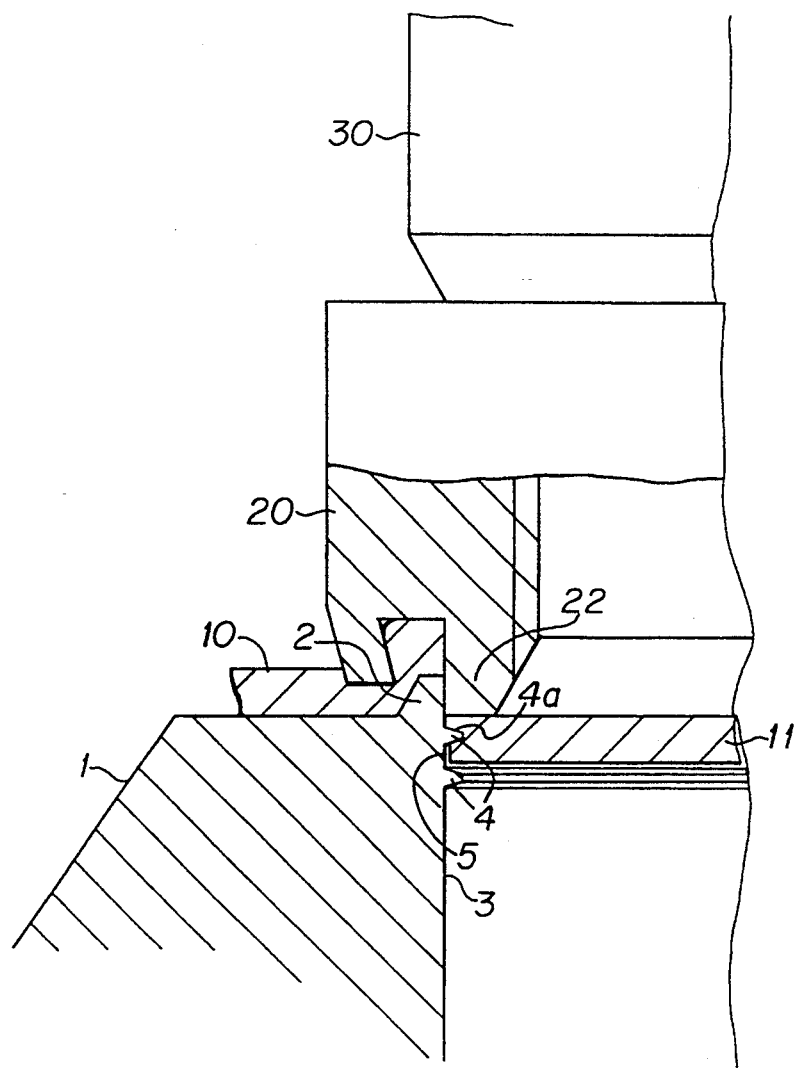
FIG. 2 is a partly cutaway front view showing the FIG. 1 embodiment of the present invention in use.
Figure 3:
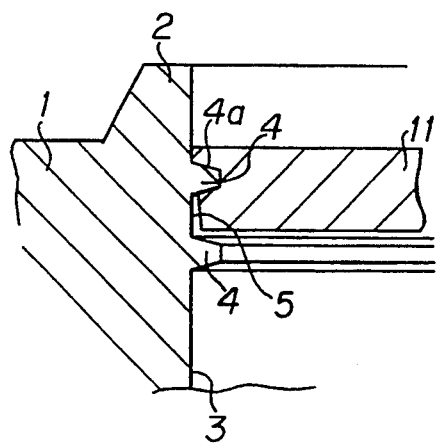
FIG. 3 is a partly cutaway front view illustrating debris held by an annular projection.
Figure 4:
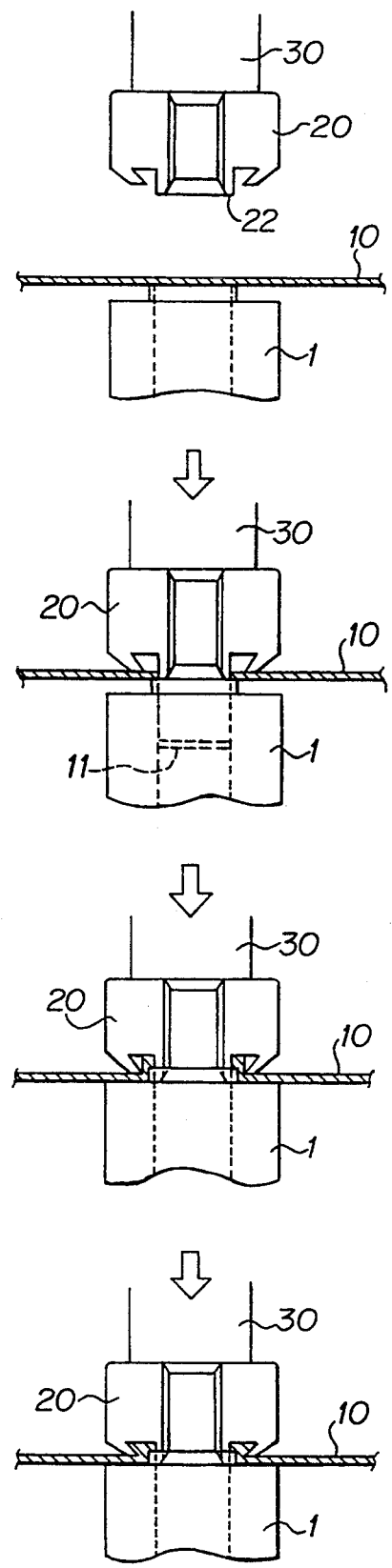
FIG. 4 is a cross-sectional view illustrating procedures for driving a pierce nut into a metal panel to pierce the metal panel to be clinched thereto.

A reference numeral "4" denotes annular projections provided at the upper portion of the center aperture 3 near the annular coining portion 2. As shown in FIG. 2, the annular projections 4 have top surfaces located slightly below the bottom surface of the pierce nut which enters the upper portion of the center aperture at the time punching is performed. This top surface of the annular projection 4 is formed to a guide face 4a which is inclined inwardly so that the periphery of the debris 11 is easily cut into the face 4a, and is shaped to have a triangular or trapezoidal cross section in this embodiment.

It is preferable that the angle defined by the guide face 4a and the wall of the center aperture 3 be 120° to 140°; it is 135° in this embodiment. The height of the annular projection 4 may be selected according to the thickness of the metal panel etc. In this example, the height of the annular projection 4 was 0.04 mm corresponding to a panel thickness of 0.5 mm.

Because the annular projection 4 should only temporarily hold driven-out debris 11 when the periphery thereof is forced into the annular projection 4, only a single annular projection 4 is sufficient for this purpose. It is however preferable, that a plurality of annular projections 4 be provided with a given space 5 therebetween, so that the debris 11 punched between the periphery of the lower end of the pierce nut and the annular coining portion 2 is pressed into the space 5 to be surely and temporarily held there. It is needless to say that the layout of the annular projections 4 and the size of the space 5 are arbitrarily determined by the thickness of the metal panel in use.

Cold work steel (JIS SKD 11) was used as the material for the die. The surface of the cold work steel was hardened in a thermal treatment to have an HRC hardness of about 60. High speed steel or cemented carbide may also be used for the die material.

With the above structure, the annular coining portion 2 for panel driving, which has its inner surface continuous to the center aperture 3 of the die body 1, is protrusively provided on the top of the die body 1, as mentioned above. Like the conventional die assembly for driving a pierce nut of this type, therefore, if the metal panel 10 is placed on the annular coining portion 2 on the top of the die body 1 and the pierce nut 20 is pressed against the metal panel 10 by the punch 30 as shown in FIG. 2, the pierce nut 20 is clinched to the metal panel 10 between the periphery of the lower end of the pierce nut 20 and the annular coining portion 2 on the top of the die body 1 while punching out the debris 11. The debris 11 punched from the metal panel 10 at this time is dropped downward from the top end of the center aperture 3, located inward of the annular coining portion 2.

However, since the annular projection 4 is provided on the inner surface of the upper portion of the center aperture 3 to receive the debris 11 from the upper guide face 4a, the pierce nut 20 pressed by the punch 30 forces the periphery of the debris 11, dropped off from the top end of the center aperture 3, into engagement with the annular projection 4 directly below the bottom surface of the pierce nut 20 so that the debris 11 can surely and temporarily be held by that annular projection 4. Thereafter, with the punch 30 moved up, the metal panel 10 is lifted up from the die body 1 for the next driving work. At the time when the metal panel 10 is lifted from the die body 1, the punched debris 11 is always engaged with and held by the annular projection 4 so that it will not be lifted together with the metal panel 10. It is therefore possible to completely prevent a continuous driving work from being disturbed by the lifting of the debris 11, or the metal panel 10 or the die body 1 from being damaged due to accidental placing of the debris 11 on the top of the die body 1.

If one step of driving one pierce nut 20 into the metal panel 10 is completed, when the next driving work is carried out in the same manner as described above with the previously punched debris 11 held by the annular projection 4, the new debris that is punched by the second driving work will force down the debris 11 that has been punched previously and held by the annular projection 4 to drop off, thus eliminating a step of removing the debris 11 temporarily held. Although the shape of the die body 1 of this example is cylindrical because a cylindrical pierce nut 20 is used in the illustrated embodiment, the shape of the die body 1 is not limited to this particular shape. For instance, with the use of a pierce nut having a rectangular cylinder shape, the die body may have a rectangular cylinder shape.

As apparent from the above description, with simple provision of at least one annular projection at the upper portion of the center aperture of the die body, debris, which is punched by a pierce nut and an annular coining portion and which is dropped in the upper portion of the center aperture, can surely and temporarily be held in the center aperture. It is therefore possible to surely prevent the debris from being lifted up when the metal panel is lifted up later. The preventive effect is particularly prominent when the metal panel thickness is under 1 mm. It is apparent that this die assembly can completely overcome the shortcomings of the conventional nut-driving die assembly of this type, such as disturbing a continuous driving work due to the lifting of the debris, or damaging of the die body by the lifted debris. The durability of the die is significantly improved, which, together with an advantage of a low-cost production due to a simpler structure, contributes greatly to the industry.

What is claimed is:

1. A die for driving a pierce nut through a plate member during punching of the plate member, comprising:
    a die body (1) having an elongated center aperture (3) extending through the die body;
    an annular coining portion (2) provided on a top surface of the die body (1) and extending upwardly from said top surface of the die body (1) said annular coining portion (2) having:
        an inner surface substantially continuous with an inner wall surface of said center aperture (3) such that said inner surface of said coining portion and said inner wall surface of said center aperture (3) together define a surface which is substantially straight in an axial direction of said center aperture (3), and
        a substantially flat top surface meeting said inner surface of said annular coining portion at a right angle,
        said annular coining portion being arranged to receive a punch portion of the pierce nut therein during punching of the plate member, said punch portion of the pierce nut having an outer diameter which is slightly smaller than an inner diameter of said annular coining portion, and said punch portion of said pierce nut having an outer surface which is substantially straight and which extends in said axial direction of said center aperture (3); and
    at least two spaced apart annular projections (4) provided at an upper portion of the wall surface of said center aperture (3), each of said annular projections (4) extending inwardly from the wall surface of said center aperture (3) so as to form at least two respective reduced diameter portions in said center aperture, adjacent ones of said at least two spaced apart annular projections (4) having a space (5) therebetween in said axial direction of said center aperture (3) for temporarily holding punched debris of the plate member which is pressed into said center aperture (3) and into said space (5) between said adjacent ones of said at least two spaced apart annular projections (4), when said pierce nut is driven through the plate member to punch the plate member;
    said plate member being punched with an outer edge of a lower end of said punch portion of said pierce nut and an edge formed between said substantially flat top surface and said inner surface of said annular coining portion, substantially without drawing central portions of said punched debris at the time of punching, when said pierce nut is driven through the plate member to punch the plate member.

2. The die of claim 1, wherein said at least two spaced apart annular projections (4) each have an inclined upper surface which forms an inclined guide face (4a) for the punched debris.

3. The die of claim 2, wherein said inclined upper surfaces of said at least two spaces apart annular projections are downwardly inclined away from the top surface of said die.

4. The die of claim 3, wherein said inclined upper surfaces of said at least two spaced apart annular projections are downwardly inclined so as to define an angle between the inclined upper surface and the wall surface of said center aperture which is from 120° to 140°.

5. The die of claim 11, wherein said angle is about 135°.

6. The die of claim 11, wherein said at least two spaced apart annular projections have a height so as to project from said wall surface of said center aperture by about 0.04 mm.

7. The die of claim 1, wherein said at least twi spaced apart annular projections have a height so as to project from said wall surface of said center aperture by about 0.04 mm.

8. The die of claim 1, wherein said annular coining portion has a tapered outer surface.

* * * * *

UNITED STATES PATENT AND TRADEMARK OFFICE
CERTIFICATE OF CORRECTION

PATENT NO. : 5,444,908
DATED : August 29, 1995
INVENTOR(S) : KAZINO

It is certified that error appears in the above-indentified patent and that said Letters Patent is hereby corrected as shown below:

```
In the ABSTRACT,
    line 6, after "aperture" insert --of the die body,
        near the annular coining portion,--
    lines 7 and 8,
        delete "of the die body, near the annular
        coining portion,"

Column 5, line 4, (claim 5),
        change "claim 11" to --"claim 4",
        line 7, (claim 6),
        change "claim 11" to --"claim 4"
Column 6, line 3 (claim 7),
        change "twi" to --two--.
```

Signed and Sealed this

Fifth Day of November, 1996

Attest:

BRUCE LEHMAN

*Attesting Officer*  *Commissioner of Patents and Trademarks*